United States Patent [19]

Khorrami

[11] Patent Number: 5,631,824

[45] Date of Patent: May 20, 1997

[54] FEEDBACK CONTROL APPARATUS AND METHOD THEREOF FOR COMPENSATING FOR CHANGES IN STRUCTURAL FREQUENCIES

[75] Inventor: Farshad Khorrami, Brooklyn, N.Y.

[73] Assignees: Polytechnic University; Omnitek Research & Development, Inc., both of Brooklyn, N.Y.

[21] Appl. No.: 249,865

[22] Filed: May 26, 1994

[51] Int. Cl.$^6$ .................................................. G05B 11/01
[52] U.S. Cl. .................... 364/176; 364/163; 318/586.22; 318/632
[58] Field of Search ................................... 364/160–163, 364/176, 177, 474.35, 172–175; 318/568.11, 568.12, 632, 568.17, 568.22, 568.18, 568.23, 611, 615, 616; 901/1, 4; 395/80, 85, 89

[56] References Cited

U.S. PATENT DOCUMENTS

| | | |
|---|---|---|
| 3,569,718 | 3/1971 | Borner. |
| 4,525,852 | 7/1985 | Rosenberg. |
| 4,585,969 | 4/1986 | Tanaka. |
| 4,600,854 | 7/1986 | Bednorz et al.. |
| 4,798,989 | 1/1989 | Miyazaki et al.. |
| 4,811,246 | 3/1989 | Fitzgerald, Jr. et al.. |
| 4,980,625 | 12/1990 | Shimada .................. 318/632 |
| 5,032,777 | 7/1991 | Ogawa .................... 318/616 |
| 5,043,621 | 8/1991 | Culp. |
| 5,118,982 | 6/1992 | Inoue et al.. |
| 5,206,569 | 4/1993 | Ozawa .................... 318/568.1 |
| 5,252,884 | 10/1993 | Dona. |
| 5,252,901 | 10/1993 | Ozawa et al. ............ 318/568.1 |
| 5,260,622 | 11/1993 | West. |
| 5,276,390 | 1/1994 | Fisher et al. ............ 318/568.1 |

OTHER PUBLICATIONS

Farshad Khorrami et al., "Experiments on Rigid Body–Based Controllers with Input Preshaping for a Two–Link Flexible Manipulator", IEEE Transactions on Robotics & Automation, vol. 10, No. 1 (1994).

Experimental Results on Active Control of Flexible–Link Manipulators with Embedded Piezoceramics; Farshad Khorrami et al.; in the proceedings of the 1993 IEEE Int. Conf. on Robotics & Automation, Atlanta, GA, May 1993, pp. 222–227.

A Self–Sensing Piezoelectric Actuator for Collocated Control; Jeffrey J. Dosch et al.; J. of Intell. Mater. Syst. and Struct., vol. 3, Jan. 1992; Technomic Publishing Co., Inc.; pp. 166–185.

Simultaneous Sensing and Actuation Using Piezoelectric Materials; Nesbitt W. Hagood et al.; presented at the SPIE Conference on Active and Adaptive Optical Components; San Diego;, Jul. 1991.

Modelling of Piezoelectric Actuator Dynamics for Active Structural Control; Nesbitt W. Hagood et al.; J. of Intell. Mater. Syst. and Struct., vol. 1, Jul. 1990; Technomic Publishing Co., Inc.; pp. 327–354.

Experiments on Rigid Body–Based Controllers with Input Preshaping for a Two–Link Flexible Manipulator; Farshad Khorrami et al.; IEEE Trans. on Robotics and Automation, vol. 10, No. 1, Feb. 1994; pp. 55–65.

(List continued on next page.)

Primary Examiner—Paul P. Gordon
Assistant Examiner—Thomas E. Brown
Attorney, Agent, or Firm—Curtis Morris & Safford P.C.

[57] ABSTRACT

An apparatus for providing feedback control of a device having multi-degrees of freedom. The apparatus comprises a first input device for receiving control signals based upon desired reference inputs and first feedback signals from the device, a second input device for receiving second feedback signals from the device, and a processing device receiving the control signals from the first input device and the second feedback signals from the second input device for determining a compensating signal for supply to the device. The compensating signal compensating for changes in structural frequencies due to configuration changes of the device so as to enable the first feedback signals to be independent of variations of the structural frequencies.

14 Claims, 4 Drawing Sheets

OTHER PUBLICATIONS

Experimental Results on Adaptive Nonlinear Control and Input Preshaping for Multi-Link Flexible Manipulators; Farshad Khorrami et al.; *Automatica*, vol. 31, No. 1, 1995; Elsevier Science Ltd., pp. 83–97.

An Adaptive Control Scheme Based on Fuzzy Logic and Its Application to Smart Structures; Issam J. Zeinoun et al.; *Smart Mater. Struct.*, 3, 1994; pp. 266–276.

FEEDBACK CONTROL APPARATUS AND METHOD THEREOF FOR COMPENSATING FOR CHANGES IN STRUCTURAL FREQUENCIES

BACKGROUND OF THE INVENTION

1. Field of the Invention

This invention relates to a feedback control technique and, more particularly, to such technique for controlling an apparatus having multi-degrees of freedom.

2. Description of the Prior Art

Typically, multi-body mechanical devices, such as robotic manipulators or cranes, weapon pointing systems, articulated structures, and the like, have nonlinear dynamics associated therewith. In these devices, the natural frequencies (that is, the structural modes of vibration) are dependent on the configuration of the respective device due to nonlinearities in the dynamics. In other words, as the device moves from one configuration (position) to another, the frequencies change. Another complication in controller synthesis for multi-body flexible devices is due to their input/state map not being feedback linearizable.

Typically, in such devices, proportional-derivative (PD) or proportional-integral-derivative (PID) controls are utilized for the rigid body motion and thereafter an outer loop controller is added to suppress the structural vibrations. The outer loop controller is normally designed to account for the large range of frequency variation which may exist due to geometric configuration changes of the respective device and, may actually be designed for the worst case thereof.

Presently, the above-described systems for controlling flexible multi-body devices compromise performance in order to achieve desired stability over the entire range of operation. For example, such systems may compromise the speed of response or control bandwidth, positional accuracy and so forth. Further, such systems may utilize a relatively complicated algorithm. As a result, the processing time may be relatively long and additional hardware may be needed to perform such processing, thereby resulting in increased costs.

Thus, the prior art has failed to provide an apparatus for providing feedback control of a device having multi-degrees of freedom which has a relatively high performance level throughout the desired operational range and which may be fabricated at a relatively low cost.

OBJECTS AND SUMMARY OF THE INVENTION

An object of the present invention is to provide a technique for providing feedback control of a device having multi-degrees of freedom which overcomes the problems associated with the prior art.

More specifically, it is an object of the present invention to provide a technique for providing feedback control of a device having multi-degrees of freedom which includes a processing device for determining a compensating signal for supply to the device which compensates for changes in the structural frequencies due to configuration changes of the device so as to enable a feedback signal from the device to be independent of variations of the structural frequencies.

Another object of the present invention is to provide a technique as aforesaid which compensates for other types of non-linearities including Coriolis effects, centripetal terms and friction effects.

A further object of the present invention is to provide a technique as aforesaid which utilizes lower actuation levels so as to use relatively small-size actuators so as to result in a relatively low weight, low power consumption, high speeds and low cost.

A still further object of the present invention is to provide a technique as aforesaid which attenuates the vibration levels associated with motion of the device.

In accordance with an aspect of the present invention, an apparatus for providing feedback control of a device having multi-degrees of freedom is provided. The apparatus comprising a first input device for receiving control signals based upon desired reference inputs and first feedback signals from the device, second input device for receiving second feedback signals from the device; and processing device receiving the control signals from the first input means and the second feedback signals from the second input means for determining a compensating signal for supply to the device. The compensating signal compensating for changes in structural frequencies due to movement of the device so as to enable the first feedback signals to be independent of variations of the structural frequencies.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

A feedback control apparatus 10 according to a first embodiment of the present invention will now be described with reference to FIGS. 1, 3 and 4.

Figure 1:
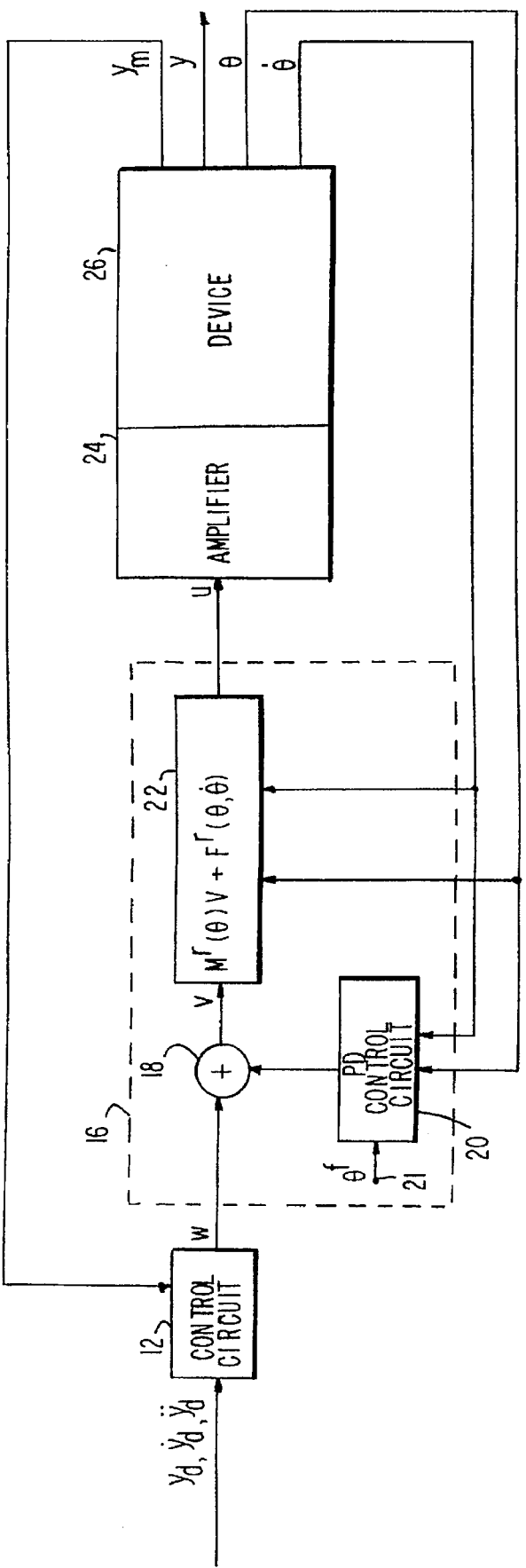
FIG. 1 is a schematic diagram of a feedback control apparatus according to an embodiment of the present invention.

As shown in FIG. 1, the feedback control apparatus 10 generally includes a control circuit 12, a processing device 16, and an amplifier 24. The apparatus 10 is adapted for use with a multi-body device 26. Such device 26 may include manipulators (such as flexible manipulators), a multi-axis machine, a weapon pointing system, a space structure and so forth. The device 26 provides a plurality of feedback signals to the various ones of the elements of the feedback control apparatus 10 as hereinafter more fully described. The processing device includes a proportional derivative (PD) control circuit 20, a summing circuit 18 and a computation circuit 22.

More specifically, the control circuit 12, which is preferably a linear-type control circuit, is coupled to one input of the summing circuit 18. The control circuit 12 receives information pertaining to the desired reference commands. Such reference commands may include information relating to the desired position, velocity and/or acceleration of the device 26. These reference commands may be supplied by an operator or may be provided from an outside apparatus (not shown). The control circuit 12 further receives a feedback signal ym from the device 26. Such feedback signal ym may be obtained from at least one accelerometer, a piezoelectric ceramic, strain gage or similar type devices mounted on the device 26. The control circuit 12 is adapted to process the received signals so as to produce a feedback signal w which is supplied to one input of the summing circuit 18.

Figure 4:
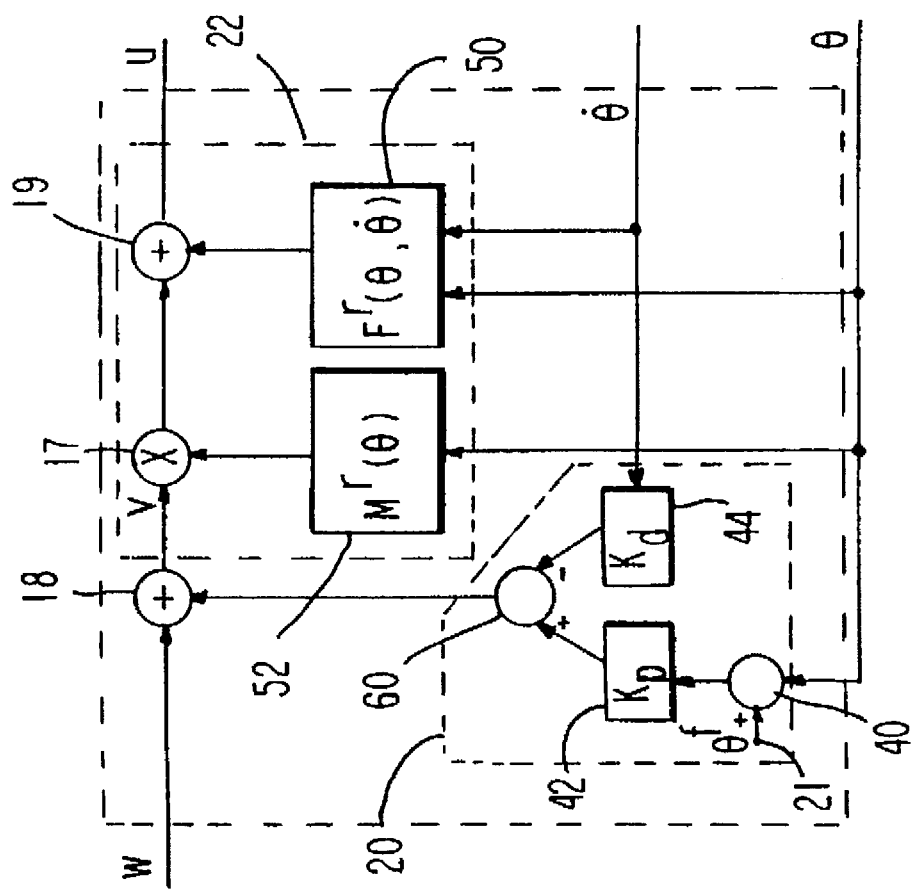
FIG. 4 is a schematic diagram of a processing device of the apparatus of FIG. 1.

As shown in FIG. 4, the PD control circuit 20 generally includes a combining circuit 40, an amplifier or gain circuit 42, an amplifier or gain circuit 44, and a combining circuit 60. One input of the combining circuit 40 receives an input signal $\theta^f$ from an input terminal 21. Such input signal $\theta^f$ represents the final desired position of the device 26 and may be supplied from the operator. Alternatively, the signal $\theta^f$ may be computed from the signals yd and the derivatives thereof. A second input of the combining circuit 40 receives a feedback signal $\theta$ from the device 26. The combining circuit 40 is adapted to sum or combine the received signals and to provide a summed signal (i.e. position error) to the amplifier 42. An amplified output signal from the amplifier 42 is supplied to one input of the combining circuit 60. A feedback signal $\dot\theta$ from the device 26 is supplied to the amplifier 44, which produces an amplified signal and supplies the same to a second input of the combining circuit 60. The combining circuit 60 is adapted to subtract the output signal of the amplifier 44 from the output signal of the amplifier 42. The subtracted output signal from the combining circuit 60, which is a gross positioning signal, is supplied to a second input of the summing circuit 18.

The summing circuit 18 is adapted to sum together the received signal w and the gross positioning signal so as to produce a summed signal v. Such summed signal v is supplied to the computation circuit 22.

The computation circuit 22, as shown in FIG. 4, generally includes a first correcting circuit 50, a second correcting circuit 52, a multiplication circuit 17 and a summing circuit 19. More specifically, the first correcting circuit 50 receives the feedback signals $\theta$ and its derivative from the device 26. Based upon the received signals, the first correcting circuit 50 is adapted to provide an output signal to one input of the summing circuit 19. The second correcting circuit 52 receives the feedback signal $\theta$ from the device 26 and, in accordance therewith, produces an output signal for supply to one input of the multiplication circuit 17. The multiplication circuit 17 further receives the signal v from the summing circuit 18 and is adapted to multiply the received signals together. A multiplied output signal is supplied from the multiplication circuit 17 to a second input of the summing circuit 19. The summing circuit 19 sums or combines the received signals together so as to form an output signal u which is supplied to the amplifier 24.

The first correcting circuit 50 is adapted to correct or compensate for velocity dependent non-linearities such as Coriolis terms, centripetal terms, and friction and so forth. The second correcting circuit 52, on the other hand, is adapted to correct or compensate for configuration dependent inertia. The elements utilized by the second correcting circuit 52 may be derived from a mass or inertia matrix of the device 26.

Figure 3:
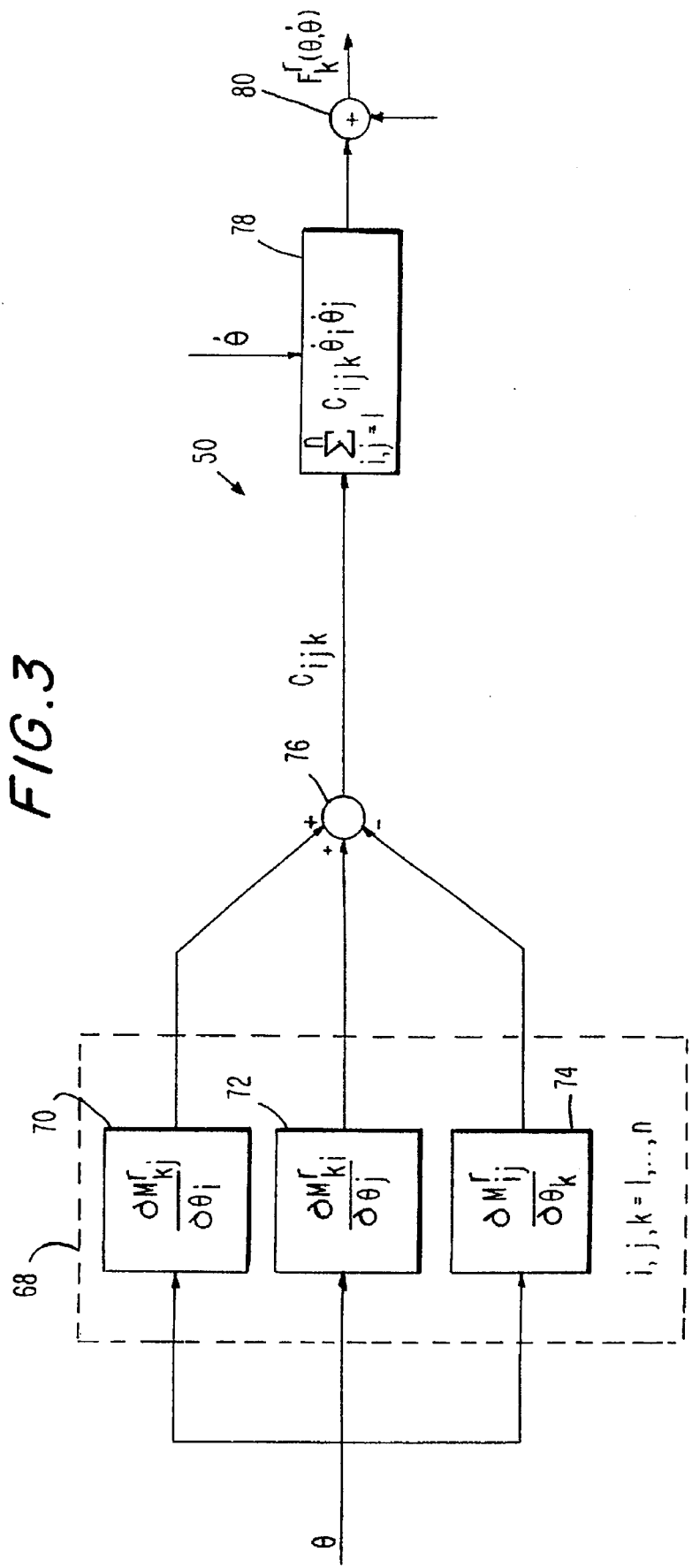
FIG. 3 is a schematic diagram of a correcting circuit of the feedback control apparatuses of FIGS. 1 and 2.

The first correcting circuit 50 may include a circuit 68, a combining circuit 76, a computation circuit 78, and a combining circuit 80 as, for example, shown in FIG. 3. More specifically, the circuit 68 includes a plurality of differentiating circuits 70, 72 and 74 which are each adapted to receive the feedback signal $\theta$ from the device 26 and to supply respective partial derivative output signals therefrom. Such output signals are supplied to the combining circuit 76 which, in turn, adds or combines the output signals from the differentiating circuits 70 and 72 together and subtracts therefrom the output signal from the differentiating circuit 74. The output signal from the combining circuit 76, along with the feedback signal $\dot\theta$ from the device 26 are supplied to the computation circuit 78. The computation circuit 78 is adapted to process the received signals in a predetermined manner and to supply an output signal therefrom to one input of the combining circuit 80. A second input of the combining circuit 80 receives other non-linear terms, such as those relating to friction. The combining circuit 80 combines the received signals together and supplies a signal therefrom to one input of the summing circuit 19 (FIG. 4).

Figure 2:
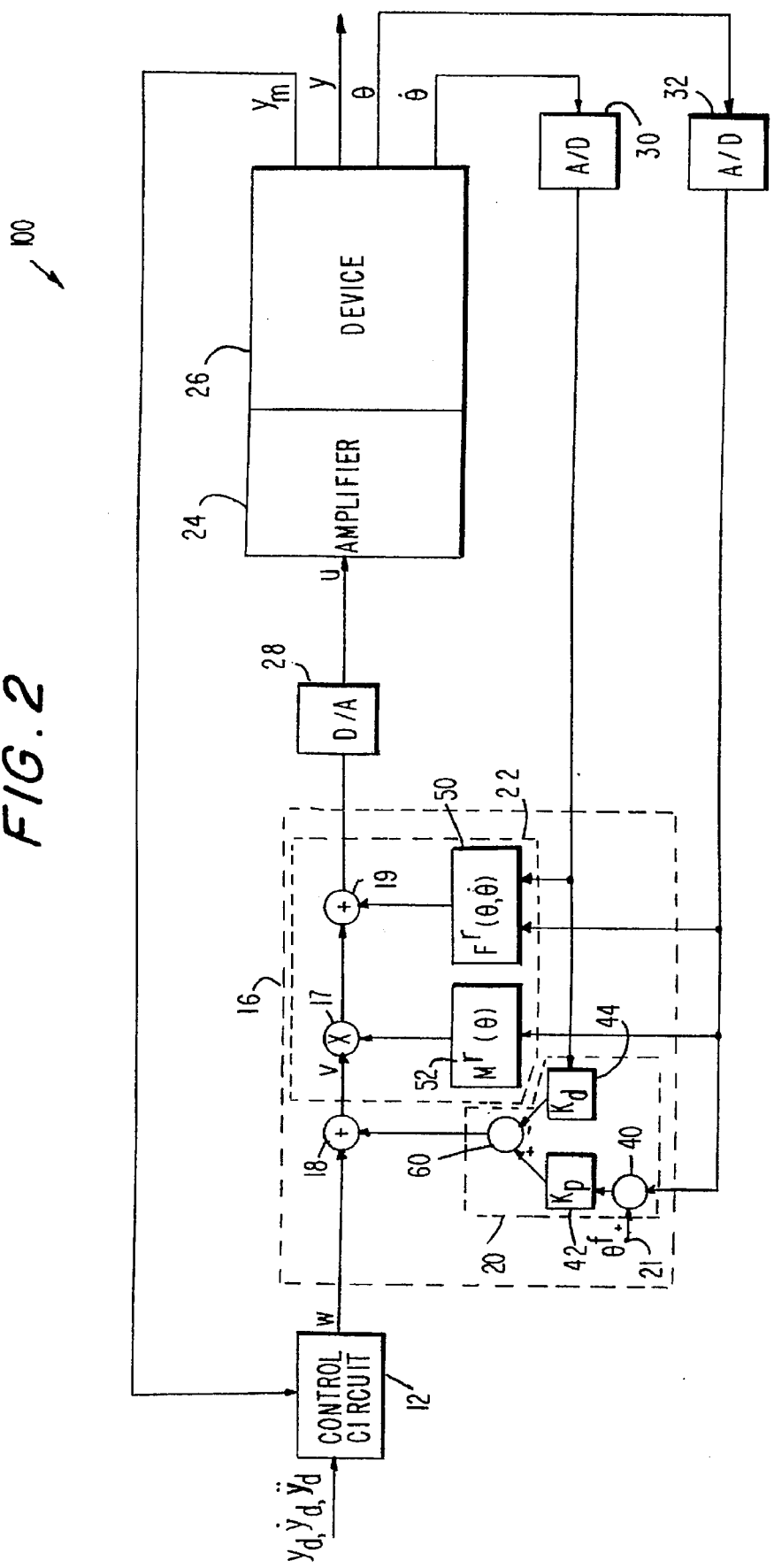
FIG. 2 is a schematic diagram of a feedback control apparatus according to another embodiment of the present invention.

FIG. 2 illustrates a feedback control apparatus 100 according to a second embodiment of the present invention. As shown therein, with the exception of analog-to-digital (A/D) converters 30 and 32 and a digital-to-analog (D/A) converter 28, the feedback control apparatus 100 is substantially similar to the feedback control apparatus 10 of FIG. 1. Accordingly, a further description thereof is omitted herein. As is to be appreciated, the A/D and D/A converters are adapted to convert the respective signals to either digital or analog form.

The following describes further details and the operation of the above-mentioned feedback control apparatuses 10 and 100.

This invention describes a specific nonlinear feedback design in conjunction with a PD controller that will compensate for these frequency variations. The nonlinear feedback achieves the reduction (or practically elimination) of frequency variations by compensating through feedback control for inertial changes due to changes in geometric configuration and cancellation of other nonlinear terms (such as Coriolis, centripetal terms, friction, and etc.).

Utilization of light-weight composite materials to reduce mass, high-precision pointing, and high speeds of operation demand modeling and control of vibrational modes of robotic devices, machines, space structures, manipulators, etc. Dynamics of multi-body systems (e.g., multi-link manipulators or cranes, multi-axis machines, weapon pointing systems, articulated structures, electronic circuit board probers) are nonlinear. Furthermore, these systems exhibit structural vibrations when the required operational speed (bandwidth) approaches or is beyond the first structural mode of vibration. Consideration of the effects of structural vibration of multi-body systems is crucial in their safe and high performance operation. The structural vibration is further amplified when high accuracy and/or operational speed is a must. For example, to accurately position an end-effector of a robotic manipulator or an end-point of a multi degree-of-freedom machine in a high speed manner, one needs to consider the structural vibrations since this will affect the settling time of the end-position. Similarly, to accurately point a weapon system while it is operating under aggressive (high speed) maneuvers, one must consider its structural vibration, e.g., the barrel on gun-turret systems on helicopters and tanks exhibits structural vibration and therefore deformations which will have deleterious effects on its pointing and therefore on the trajectory of the projectile. Similarly, maneuvering of spacecrafts especially when they have been built to be light weight or have large solar panels will cause structural vibrations. In turn, the structural vibrations will affect the structural integrity of the system and/or its pointing accuracy (e.g., the Hubble telescope).

As mentioned earlier, the dynamics of multi-body systems are nonlinear. One of the effects of the nonlinearities is the fact that the vibrational frequencies of the systems are configuration dependent, i.e., different geometric configurations of these systems will have different vibrational frequencies. For instance, locking or positioning the joint angles of a robotic device (excluding the first joint angle) at different angles will cause the device to exhibit different vibrational frequencies. Similarly for weapon systems, attaining different elevation and azimuth angles will cause different vibrational frequencies of the system. The amount of variation in the vibrational frequencies will depend on the relative change in joint angles or articulation angles, the mechanical design of the system, and loads it is carrying, etc.

The aforementioned variation in the vibrational frequencies of multi-body systems may be observed from their dynamics. A finite dimensional approximation[1] of the dynamics of a multi-body flexible system is $$M(x)\ddot{x}+D\dot{x}+Kx+F(x,\dot{x})=Bu \quad (1)$$

where x is the generalized coordinates containing the rigid body and flexural variables, M is the mass or inertia matrix, D is the damping matrix, K is the stiffness matrix, F is the vector of all nonlinearities such as Coriolis, centripetal terms, possibly other frictional effects, and etc[2], B is the input matrix, and u is the vector of control signals or inputs to the system. The control inputs may include not only the rigid body actuators, but also other actuators (e.g., piezoceramics, proof mass actuators, torque wheels, and etc.) added to the system for further performance enhancement.

[1] The analysis may also be carried out on the partial differential equations governing the dynamics of the system.
[2] F may also contain the gravitational effects. For brevity and clarity of explanations to follow, gravity terms are not included. However, the analysis will go through in a similar fashion.

As it can be seen from the dynamical equation given by (1), the mass matrix is position dependent (x); therefore, for different positions, different nominal values of the mass matrix are attained. In turn, this will cause a change in the frequencies of the overall system. This may be seen from the linearization of the dynamics around an operating point, $x_e$, i.e., $$M(x_e)\delta\ddot{x}+D\delta\dot{x}+K\delta x=B\delta u \quad (2)$$

The eigenvalues of the open-loop (no control) linearized system are the roots of the following equation:

$$det(M(x_e)\lambda^2+D\lambda+K)=0 \quad (3)$$

where det(.) stands for the determinant of (.).

It may be noticed that the roots of equation (3) and therefore the frequencies of the system will change at different operating points since M changes as a function of $x_e$. This effect is most noticeable when the rigid body variables are changed. This invention addresses reducing (practically eliminating) this frequency variation through a nonlinear feedback design. The development of the nonlinear feedback design is stated next.

Partition (1) in the following manner:

$$\begin{bmatrix} M_{rr} & M_{fr} \\ M_{rf} & M_{ff} \end{bmatrix}\begin{bmatrix} \ddot{\theta} \\ \ddot{\eta} \end{bmatrix} + \begin{bmatrix} D_{rr} & 0 \\ 0 & D_{ff} \end{bmatrix}\begin{bmatrix} \dot{\theta} \\ \dot{\eta} \end{bmatrix} + \begin{bmatrix} 0 & 0 \\ 0 & k \end{bmatrix}\begin{bmatrix} \theta \\ \eta \end{bmatrix} + \quad (4)$$

-continued $$\begin{bmatrix} f_1(\theta,\dot{\theta}) \\ f_2(\theta,\dot{\theta}) \end{bmatrix} + \begin{bmatrix} c_1(\theta,\dot{\theta},\eta,\dot{\eta}) \\ c_2(\theta,\dot{\theta},\eta,\dot{\eta}) \end{bmatrix} = \begin{bmatrix} I \\ 0 \end{bmatrix}u$$

where $\theta$ is the vector of the rigid body variables, $\eta$ is the vector of the flexure variables, M is the inertia matrix, $f_i$ are the vectors containing Coriolis, centrifugal, and other nonlinear terms containing the rigid body coordinates only[3], $c_i$ are the vectors which represent coupling of the flexible and the rigid (joint) variables, $D_{\tau,\tau}$ and $D_{\tau,f}$ are damping coefficient matrices, k is the diagonal stiffness matrix, and u is the generalized inputs (torques at the joints) to the system.

[3] $f_1$ is the Coriolis and centripetal terms in rigid body motions and for open kinematic chains are derivable from the elements in the mass matrix. The necessary computations are shown in FIG. 3.

The advocated nonlinear control (refer to FIGS. 1 and 2) is given by $$u=M^\tau(\theta)v+F^\tau(\theta,\dot{\theta}) \quad (5)$$

where $M^\tau(\theta)=M_{\tau,\tau}|_{\eta=0}$ $F^\tau(\theta)=f_1+D_{\tau,\tau}\dot{\theta}+$other nonlinear terms $v=k_p(\theta_f-\theta)-k_d\dot{\theta}$ and $\theta_f$ is the final position the rigid body needs to attain.

Several features of the above-described feedback control apparatuses include the following:

1. Reduction (or practically elimination) of frequency variation due to geometric configuration variation of a multi-body system exhibiting structural flexibility through the use of a nonlinear control (also known as feedback linearization or inverse dynamics) compensating for the nonlinear geometric based rigid body dynamics.

2. Further reduction of frequency variations by utilizing an asymptotic expansion on the partial differential equations governing the dynamics of the system through utilization of higher order terms in the expansion. In 1 above, the zeroth order term is only utilized and in most applications that would suffice.

3. Reduction in the effects of the nonlinearities such as Coriolis, centripetal terms, and/or friction effects in conjunction with the aforementioned controller in 1 above.

4. Application of any linear controller (feedforward or feedback scheme) in conjunction with this nonlinear control scheme will yield better performance over the whole operating range of the device. This will include linear feedforward or feedback control designs such as preshaping or prefiltering of the commanded trajectory to the system and feedback designs using sensors (e.g., piezoceramics, accelerometers, strain gauges, etc.) to pick up information on structural vibration.

5. Reduction in actuator size needed to perform high speed tasks comparable to a linear based design such as a proportional-integral-derivative (PID) control. Therefore, more efficient and smaller size actuators may be employed to reduce the overall weight of the structure and therefore permit higher speeds of operation.

6. A means for design of multi-body systems that yields the smallest frequency variation in the system by either minimizing the variation in the mass or inertia matrix and/or by actively compensating for these effects through mechanical or electrical counterbalancing.

Further, as is to be appreciated, the processing device 16 may be arranged on one or more integrated circuit (IC) chips.

Although the above-described feedback control apparatuses were described as having a control circuit 12 which was described as being a linear type control device, the present invention is not so limited. Other types of control devices, such as a non-linear type control circuit may be utilized therein.

The following articles are hereby incorporated by reference into the present application:

1. Farshad Khorrami et al., "Experimental Results on Adaptive Nonlinear Control and Input Preshaping for Multi-link Flexible Manipulators", *Automatica* (in press).

2. Farshad Khorrami et al., "Experiments on Rigid Body-Based Controllers with Input Preshaping for a Two-link Flexible Manipulator", *IEEE Transactions on Robotics and Automation*, Vol. 10. No.1 (1994).

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. An apparatus for providing feedback control of a device having multi-degrees of freedom, said apparatus comprising:

first input means for receiving control signals based upon desired reference inputs and first feedback signals from said device;

second input means for receiving second feedback signals from said device; and processing means receiving said control signals from said first input means and said second feedback signals from said second input means for determining a compensating signal for supply to said device, said compensating signal compensating for changes in inertial variations of said device due to configuration changes of said device so as to enable said first feedback signals to be substantially independent of variations of structural frequencies of said device.

2. An apparatus as in claim 1, wherein said device includes at least one movable component and wherein said processing means includes means for compensating for non-linearities due to movement changes of said at least one component.

3. An apparatus as in claim 2, wherein said processing means further includes proportional derivative (PD) control means for producing a PD output signal.

4. An apparatus for providing non-linear feedback control of a device having multi-degrees of freedom, said apparatus comprising:

first input means for receiving control signals based upon desired reference inputs and first feedback signals from said device;

second input means for receiving second feedback signals from said device; and processing means receiving said control signals from said first input means and said second feedback signals from said second input means for processing the received control signals and second feedback signals in a non-linear manner so as to determine a compensating signal for supply to said device, said compensating signal compensating for changes in inertial variations of said device due to configuration changes of said device so as to enable said first feedback signals to be substantially independent of variations of structural frequencies of said device.

5. A method for providing feedback control of a device having multi-degrees of freedom, said method comprising the steps of:

receiving control signals based upon desired reference inputs;

receiving first and second feedback signals from said device; and determining a compensating signal from said control signals and said second feedback signals for supply to said device, said compensating signal compensating for changes in inertial variations of said device due to configuration changes of said device so as to enable said first feedback signals to be substantially independent of variations of structural frequencies of said device.

6. An apparatus for providing feedback control of a device having multi-degrees of freedom and at least one movable component, said apparatus comprising:

first input means for receiving control signals based upon desired reference inputs and first feedback signals from said device;

second input means for receiving second feedback signals from said device; and processing means receiving said control signals from said first input means and said second feedback signals from said second input means for determining a compensating signal for supply to said device, said compensating signal compensating for changes in structural frequencies due to configuration changes of said device so as to enable said first feedback signals to be independent of variations of said structural frequencies, said processing means including proportional derivative (PD) control means for producing a PD output signal and means for compensating for non-linearities due to movement changes of said at least one component, wherein said means for compensating includes first correcting means for correcting for changes in inertial variation of said device and for scaling said PD signal.

7. An apparatus as in claim 6, wherein said means for compensating further includes second correcting means for correcting for velocity dependent non-linearities of said device.

8. An apparatus for providing feedback control of a device having multi-degrees of freedom, said apparatus comprising:

input means for receiving desired reference input signals and feedback signals from said device;

means for producing control signals from said reference input signals and said feedback signals; and processing means for receiving said control signals, said processing means including first correcting means for correcting for changes in inertial variation of said device due to configuration changes of said device and for determining a compensating signal which compensates for said changes in inertial variations of said device so as to enable said feedback signals to be substantially independent of variations in structural frequencies of said device and for supplying said compensating signal to said device.

9. An apparatus as in claim 8, wherein said processing means further includes second correcting means for correcting for velocity dependent non-linearities of said device.

10. An apparatus as in claim 9, wherein the producing means includes proportional derivative (PD) producing means for producing PD control signals for supply to said processing means.

11. An apparatus comprising:

a device having multi-degrees of freedom and having variable structural frequencies due to configuration changes of said device, said device providing at least one feedback signal; and feedback control means receiving said at least one feedback signal for generating a control signal therefrom and for supplying said control signal to said device, said control signal correcting for changes in inertial variation of said device so that the combination of said device and said feedback control means has a substantially constant structural frequency for different configurations of said device.

12. An apparatus as in claim 11, wherein said control signal further corrects for velocity dependent non-linearities of said device.

13. An apparatus comprising:

a device having multi-degrees of freedom and having variable structural frequencies due to configuration changes of said device, said device providing at least one feedback signal; and feedback control means receiving said at least one feedback signal for generating a control signal therefrom and for supplying said control signal to said device, said control signal correcting for changes in inertial variation of said device so that the combination of said device and said feedback control means behaves in a substantially linear manner.

14. An apparatus as in claim 13, wherein said control signal further corrects for velocity dependent non-linearities of said device.

* * * * *